US008626959B2

(12) United States Patent
Ruzek et al.

(10) Patent No.: US 8,626,959 B2
(45) Date of Patent: Jan. 7, 2014

(54) DISCOVERY AND CONFIGURATION OF NEW DEVICES ADDED VIA DYNAMIC RECONFIGURATION

(75) Inventors: Gary Lee Ruzek, Austin, TX (US); Chris Alan Schwendiman, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 200 days.

(21) Appl. No.: 13/224,543

(22) Filed: Sep. 2, 2011

(65) Prior Publication Data

US 2013/0060967 A1 Mar. 7, 2013

(51) Int. Cl.
*G06F 3/00* (2006.01)
(52) U.S. Cl.
USPC .......................................................... 710/8
(58) Field of Classification Search
USPC .......................................................... 710/8
See application file for complete search history.

(56) References Cited

U.S. PATENT DOCUMENTS

| | | | |
|---|---|---|---|
| 6,336,152 B1 * | 1/2002 | Richman et al. | 710/8 |
| 7,162,554 B1 * | 1/2007 | Cole et al. | 710/104 |
| 7,203,774 B1 | 4/2007 | Zhou et al. | 710/17 |
| 7,864,713 B2 | 1/2011 | Ban | 370/256 |

* cited by examiner

*Primary Examiner* — Chun-Kuan Lee
(74) *Attorney, Agent, or Firm* — Van Leeuwen & Van Leeuwen; Matthew B. Talpis (57) ABSTRACT

An approach is provided in which a device is detected when it has been added to an operating system partition. The detecting occurs during a dynamic reconfiguration process, and the device is associated with a device type. A parent device is identified that corresponds to the added device. The identifying of the parent device is performed during the dynamic reconfiguration process and the identification of the parent device is based on the device type of the added device with the identified parent device corresponding to a parent device name. A unit address corresponding to the added device is retrieved and this retrieved unit address and the identified parent device name are passed to a configuration manager process. The added device is then configured based on the identified parent device name.

20 Claims, 5 Drawing Sheets

DISCOVERY AND CONFIGURATION OF NEW DEVICES ADDED VIA DYNAMIC RECONFIGURATION

TECHNICAL FIELD

The present disclosure relates to an approach to discover new devices added to a computer system through dynamic reconfiguration. More particularly, the present disclosure provides an approach that discovers and configures such devices.

BACKGROUND OF THE INVENTION

In some system environments, when new devices are added to a partition via Dynamic Reconfiguration (DR), the operating system (OS) executes code to discover these devices and configure them. Configuration may include, for example, loading a device driver and making the device available for use by applications. In the AIX™ operating system this is accomplished by running a particular command (the "cfgmgr" command). The drawback to executing this command is that it processes all device configuration methods to look for new devices. In partitions with a lot of devices, this can take a very long time (minutes to hours). This can result in a lengthy delay before the newly added device can be utilized by users and system applications.

SUMMARY

An approach is provided in which a device is detected when it has been added to an operating system partition. The detecting occurs during a dynamic reconfiguration process, and the device is associated with a device type. A parent device is identified that corresponds to the added device. The identifying of the parent device is performed during the dynamic reconfiguration process and the identification of the parent device is based on the device type of the added device with the identified parent device corresponding to a parent device name. A unit address corresponding to the added device is retrieved and this retrieved unit address and the identified parent device name are passed to a configuration manager process. The added device is then configured based on the identified parent device name.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
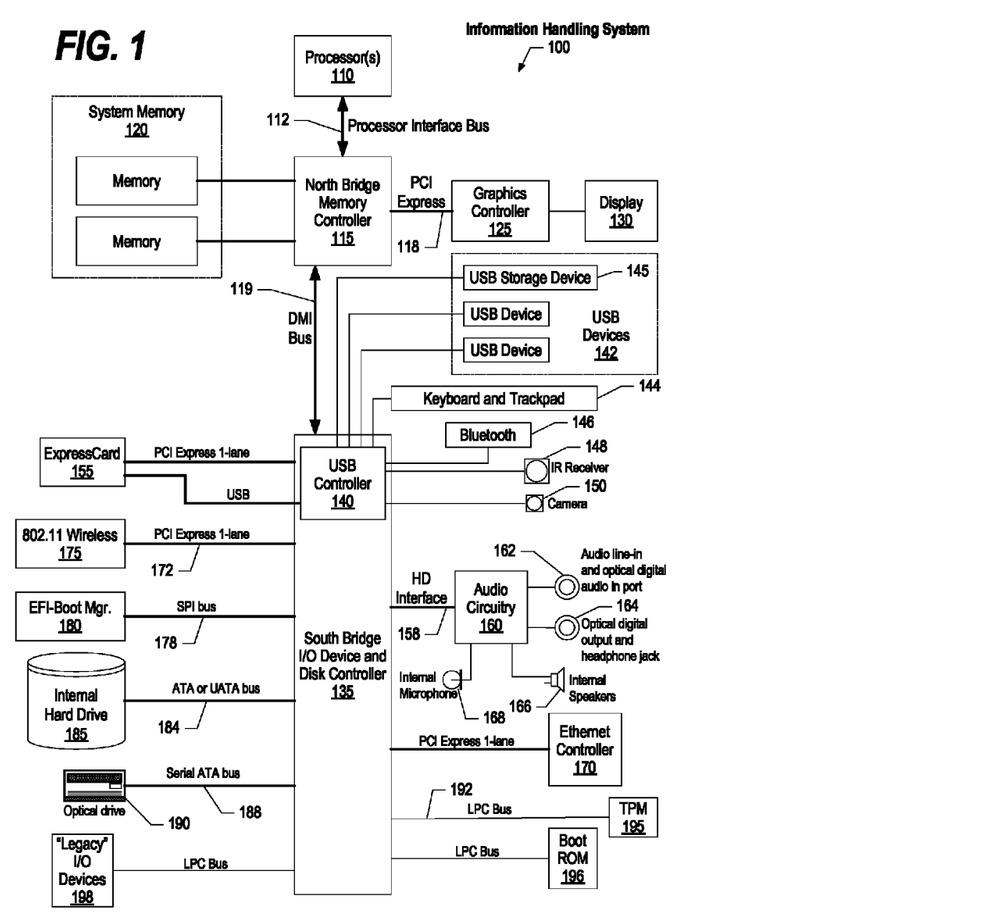
FIG. 1 is a block diagram of a data processing system in which the methods described herein can be implemented.
Figure 2:
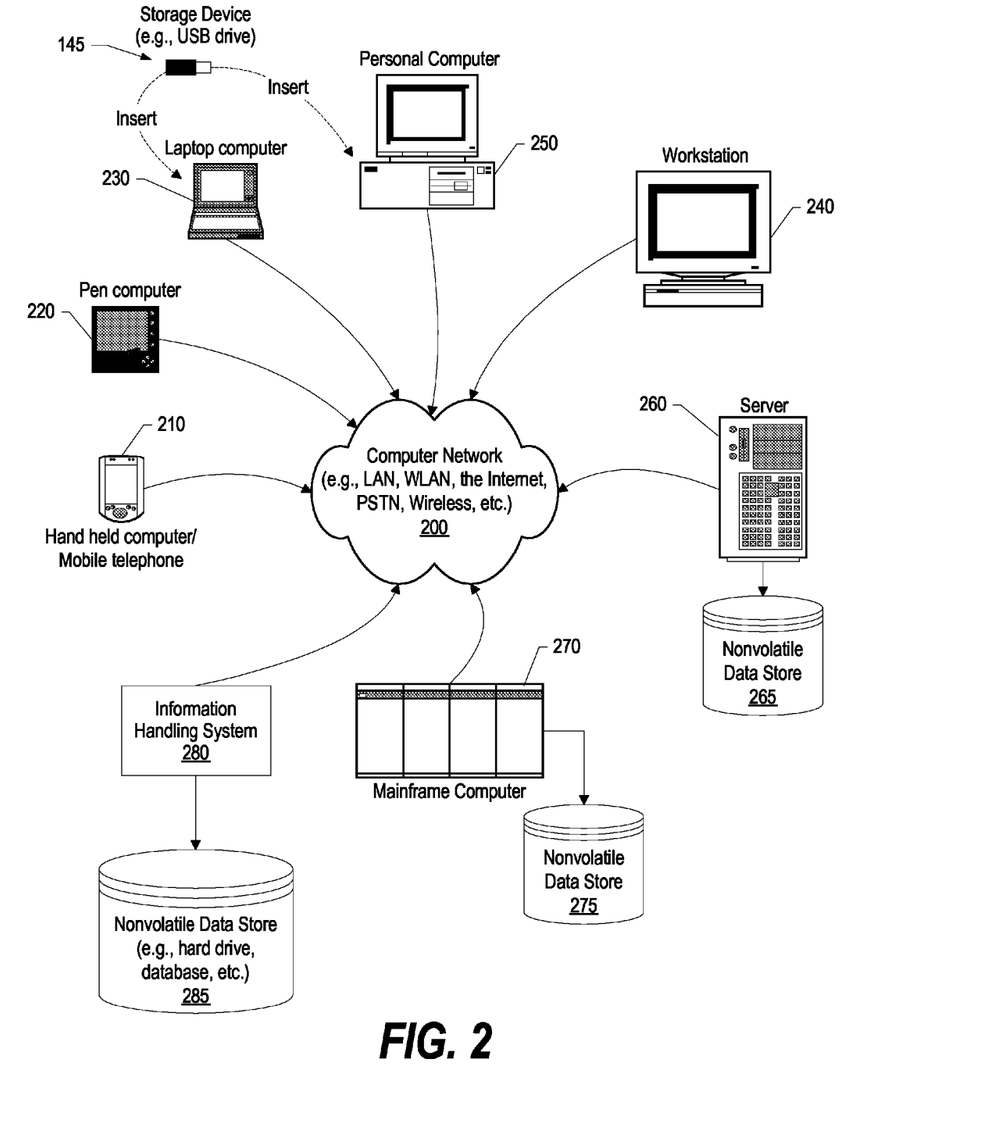
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
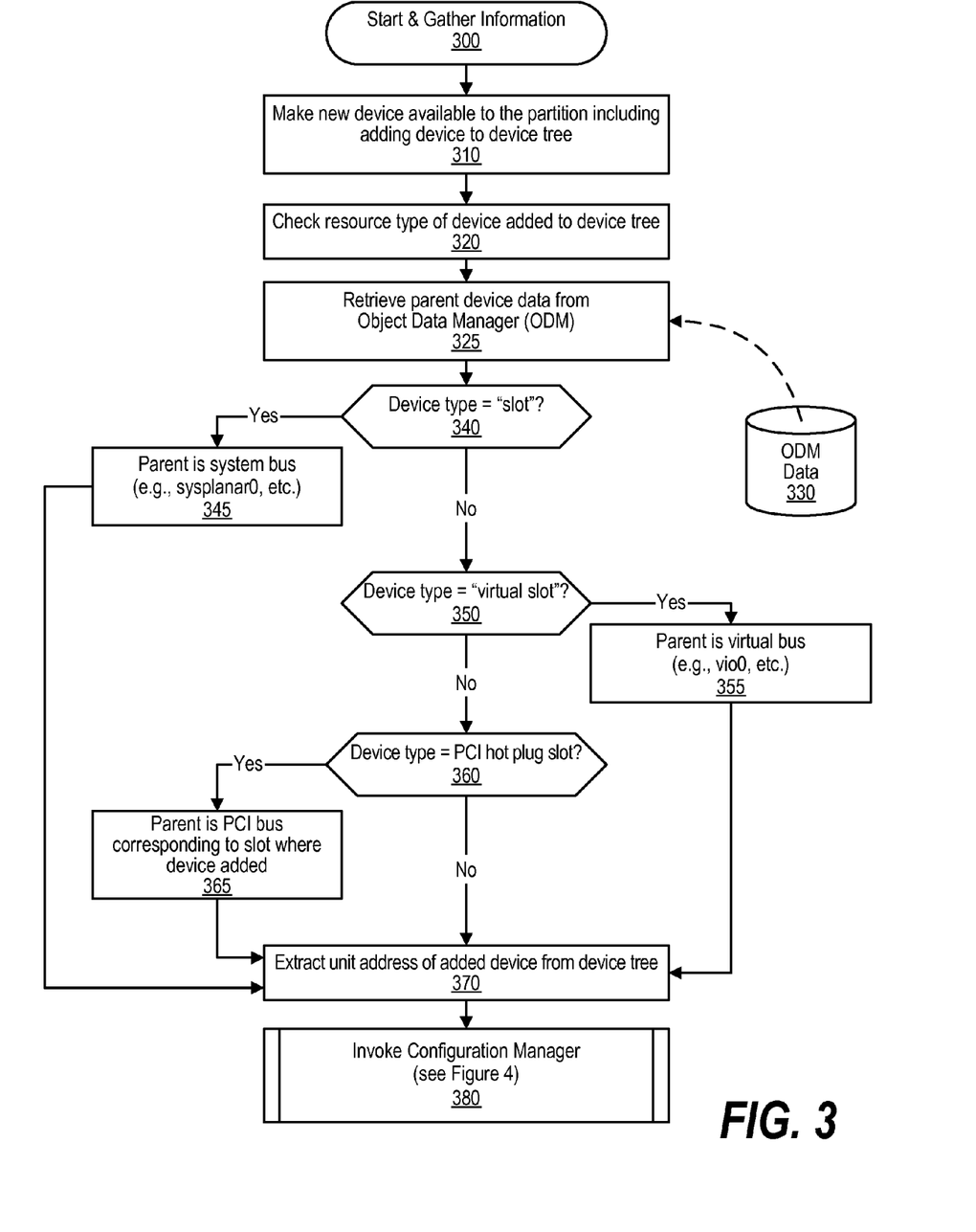
FIG. 3 is a flowchart showing steps taken to identify a device added to an operating system partition and to retrieve parent device data.

FIG. 3 is a flowchart showing steps taken to identify a device added to an operating system partition and to retrieve parent device data. Processing commences at 300 whereupon, at step 310, the process makes the newly added device available to the partition by including data pertaining to the newly added device to the device tree. At step 320, the resource type of the newly added device is checked. At step 325, the dynamic reconfiguration process identifies the parent device based on the type of device that was added to the system. The parent device data is then retrieved from Object Data Manager (ODM) data store 330.

A decision is made as to whether the added device type is a "slot" device (decision 340). If the newly added device has a device type indicating that the device is a slot device, then decision 340 branches to the "yes" branch whereupon, at step 345, the parent of the newly added device is deemed to be the system bus (e.g., sysplanar0, etc.).

On the other hand, if the added device type does not indicate that the added device is a slot device, then decision 340 branches to the "no" branch whereupon a decision is made as to whether the device's type indicates that the device is a virtual slot device (decision 350). If the newly added device has a device type indicating that the device is a virtual slot device, then decision 350 branches to the "yes" branch whereupon, at step 355, the parent of the newly added device is deemed to be a virtual bus (e.g., vio0, etc.).

On the other hand, if the added device type does not indicate that the added device is a virtual slot device, then decision 350 branches to the "no" branch whereupon a decision is made as to whether the device's type indicates that the device is a PCI hot plug slot device (decision 360). If the newly added device has a device type indicating that the device is a PCI hot plug slot device, then decision 360 branches to the "yes" branch whereupon, at step 365, the parent of the newly added device is deemed to be the PCI bus that corresponds to the slot where the newly added device was added to the system.

After the parent device has been identified as discussed in steps 325 through 365, the unit address of the newly added device is extracted from the device tree. At predefined process 380, the identified parent device and the retrieved unit address are used by the configuration manager to configure the newly added device (see FIG. 4 and corresponding text for processing details).

Figure 4:
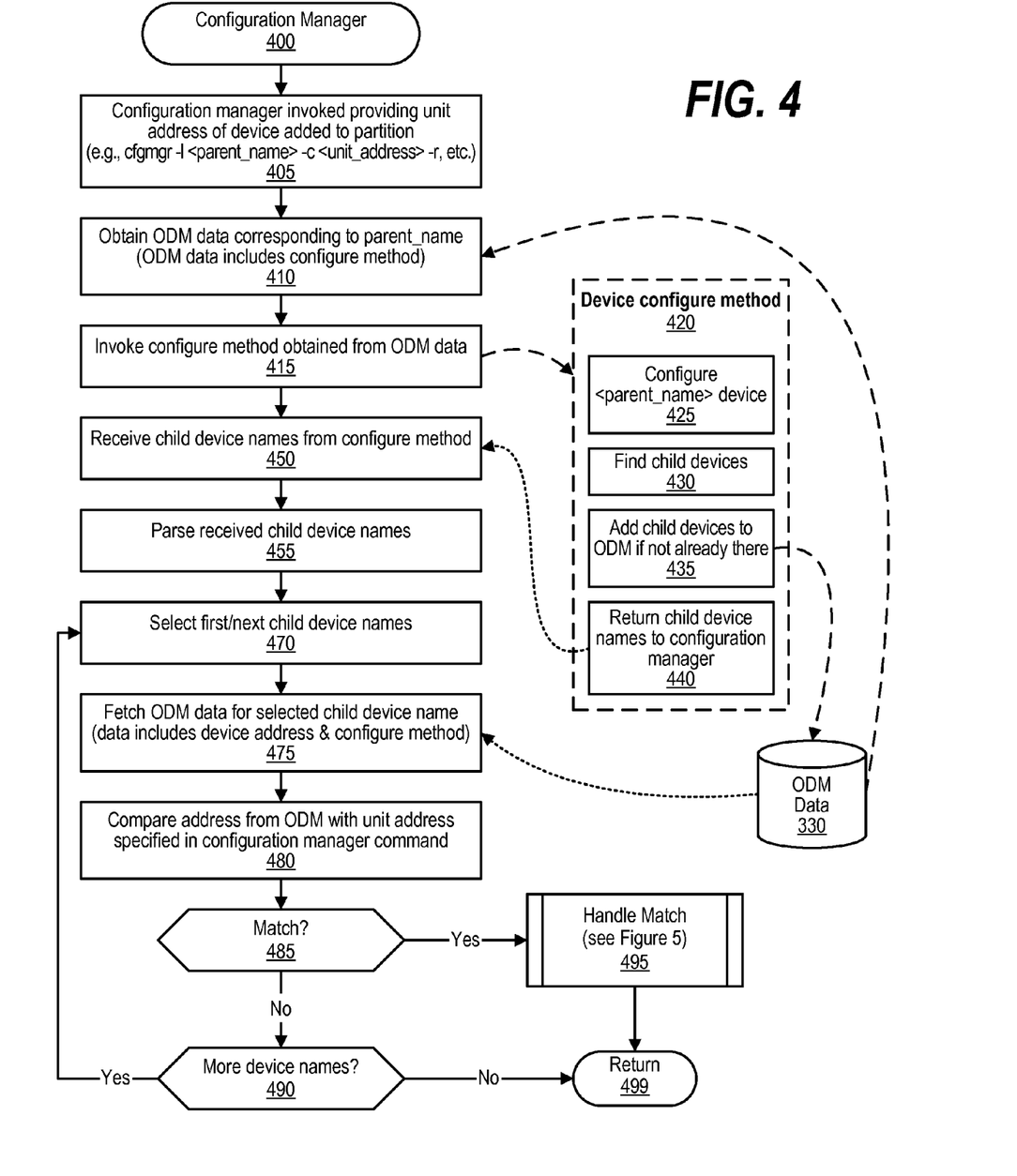
FIG. 4 is a flowchart showing steps taken by a configuration manager to execute a parent configuration method and identify child device data that matches the device added to the operating system partition.

FIG. 4 is a flowchart showing steps taken by a configuration manager to execute a parent configuration method and identify child device data that matches the device added to the operating system partition. This configuration manager process is called by predefined process 380 in the flowchart shown on FIG. 3. In FIG. 4, the configuration manager process is shown commencing at 400 whereupon, at step 405, the configuration manager is invoked by providing the unit address and parent name of the device that is being added to the system. For example, using a command with parameters such as "cfgmgr-l <parent_name>-c <unit_address>-r", etc., where <parent_name> is the name (identifier) of the parent device and <unit_address> is the unit address that corresponds to the newly added device.

At step 410, object data manager (ODM) data that corresponds to the parent device (<parent_name>) is retrieved from ODM data store 330. The ODM data identifies a configuration method that corresponds to the parent device. At step 415, the identified configure method is invoked, as shown in device configure method 420. Device configure method 420, in this case configuring the parent device, commences at 425 with the invocation being to configure the parent (<parent_name>) device. At step 430, the configure method identifies (finds) child devices that correspond to the parent device. At step 435, data pertaining to the identified child devices are added to ODM data store 330 if such child device data is not yet stored in the ODM data store. At step 440, the parent configure method returns a list of one or more child device names to the configuration manager process.

At step 450, the configuration manager process receives the child device names returned from the parent device configure method and, at step 455, the received child device names are parsed. At step 470, the first returned child device name is selected. At step 475, ODM data pertaining to the selected child device name is retrieved from ODM data store 330. The data pertaining to the child device includes the child device address and the configure method that is used to configure the child device. At step 480, the child device address from the ODM data is compared with the unit address of the newly added device. In one embodiment, the unit address of the newly added device was provided to the configuration manager as an argument when the configuration manager was invoked.

A decision is made as to whether the child device address from the ODM data for the selected child device matches the unit address of the newly added device (decision 485). If the addresses do not match, then decision 485 branches to the "no" branch whereupon a decision is made as to whether there are additional device names to process (decision 490). If there are more device names to process, then decision 490 branches to the "yes" branch which loops back to select the next child device name (step 470) and process it as outlined above. If there are no more child device names to process, then decision 490 branches to the "no" branch whereupon processing returns at 499. Returning to decision 485, if the child device address from the ODM data for the selected child device name matches the unit address of the newly added device, then decision 485 branches to the "yes" branch whereupon, at predefined process 495, the match is handled (see FIG. 5 and corresponding text for processing details) after which processing returns at 499.

Figure 5:
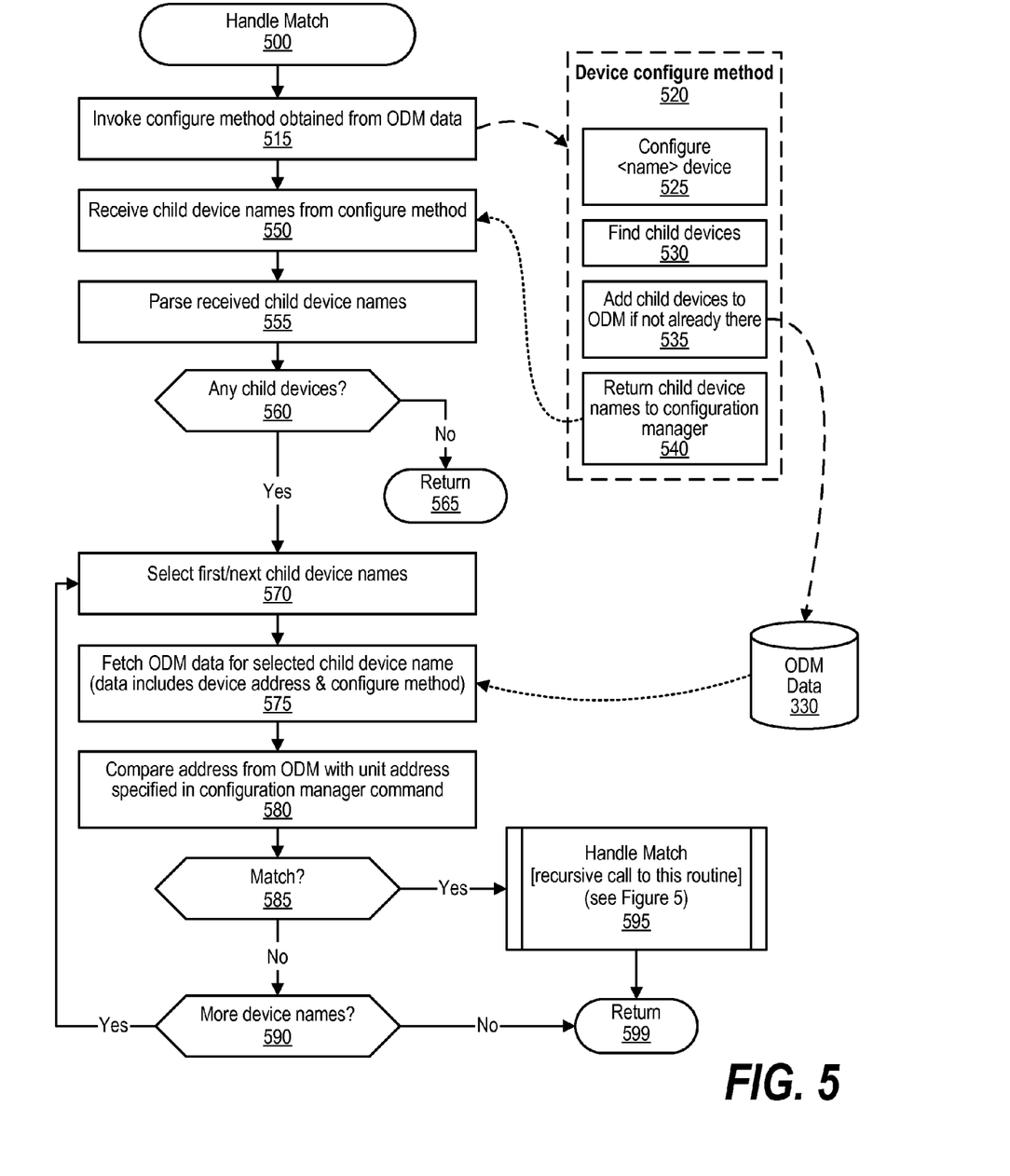
FIG. 5 is a flowchart showing steps taken when matching child device data is identified and a child configuration method is obtained and invoked to configure the added device.

FIG. 5 is a flowchart showing steps taken when matching child device data is identified and a child configuration method is obtained and invoked to configure the added device. Processing commences at 500 whereupon, at step 515, the process invokes the configure method pertaining to the newly added device, the process being retrieved from ODM data store 330 as shown and described in FIG. 4.

Device configure method 520, in this case configuring the child device, commences at 525 with the invocation being to configure the newly added device (<name>). At step 530, the configure method identifies (finds) any child devices that correspond to the newly added device. At step 535, data pertaining to the identified child devices are added to ODM data store 330 if such child device data is not yet stored in the ODM data store. At step 540, the configure method returns a list of one or more child device names to the configuration manager process with each of the child devices being children of the newly added device.

At step 550, the configuration manager process receives the child device names returned from the configure method corresponding to the newly added device and, at step 555, the received child device names are parsed. A decision is made as to whether there are any child device names that pertain to the newly added device (decision 560). If there are no child devices that pertain to the newly added device, then decision 560 branches to the "no" branch whereupon processing returns to the calling routine at 565.

On the other hand, if there are child devices pertaining to the newly added device, decision 560 branches to the "yes" branch whereupon, at step 570, the first returned child device name is selected. At step 575, ODM data pertaining to the selected child device name is retrieved from ODM data store 330. The data pertaining to the child device includes the child device address and the configure method that is used to configure the child device. At step 580, the child device address from the ODM data is compared with the unit address of the newly added device. In one embodiment, the unit address of the newly added device was provided to the configuration manager as an argument when the configuration manager was invoked.

A decision is made as to whether the child device address from the ODM data for the selected child device matches the unit address of the newly added device (decision 585). If the addresses do not match, then decision 585 branches to the "no" branch whereupon a decision is made as to whether there are additional device names to process (decision 590). If there are more device names to process, then decision 590 branches to the "yes" branch which loops back to select the next child device name (step 570) and process it as outlined above. If there are no more child device names to process, then decision 590 branches to the "no" branch whereupon processing returns at 599. Returning to decision 585, if the child device address from the ODM data for the selected child device name matches the unit address of the newly added device, then decision 585 branches to the "yes" branch whereupon, at predefined process 595, the match is recursively handled using the routine shown in FIG. 5 (with the routine now identifying child devices of the selected child device). The routine shown in FIG. 5 can then be recursively called by successive generations of child devices. When processing of the child device is complete, processing returns at 599.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   detecting that a device has been added to an operating system partition, wherein the detecting occurs during a dynamic reconfiguration process, and wherein the device is associated with a device type;
   identifying a parent device that corresponds to the added device, wherein the identifying is performed during the dynamic reconfiguration process, wherein the identified parent device is based on the device type of the device, and wherein the identified parent device corresponds with a parent device name;
   retrieving a unit address corresponding to the added device;
   passing the retrieved unit address and the identified parent device name to a configuration manager process; and
   configuring the added device based on the identified parent device name.

2. The method of claim 1 wherein the parent device name is a system bus in response to the device type being a slot device, wherein the parent device name is a virtual bus in response to the device type being a virtual slot device, and wherein, in response to the device type being a PCI hot plug slot, the parent device name is a PCI bus that corresponds to a slot where the device was added.

3. The method of claim 1 further comprising:
   making the added device available to processes by including the added device in a system device tree;
   checking a resource type of the added device; and
   retrieving parent device data corresponding to the identified parent device name from an object data manager.

4. The method of claim 3 further comprising:
   obtaining a parent configuration method from the retrieved parent device data, wherein the configuring of the added device includes invoking the obtained parent configuration method.

5. The method of claim 4 further comprising:
   executing the obtained parent configuration method in response to the invoking;
   receiving one or more child device names in response to the execution of the obtained parent configuration method;
   retrieving a plurality of child device name data corresponding to one or more of the child device names, wherein the child device name data includes a child device address and a child device configuration method;
   identifying one of the child device addresses included in the child device name data that matches the unit address that corresponds to the added device; and
   obtaining a child configuration method from the child device name data that corresponds to the identified child device address, wherein the configuring of the added device includes invoking the obtained child configuration method.

6. The method of claim 5 wherein the executing, receiving, retrieving, identifying, and obtaining steps are recursively repeated for one or more additional levels of child devices.

7. The method of claim 5 further comprising:
   executing the obtained child configuration method in response to the invoking;
   receiving one or more grandchild device names in response to the execution of the obtained child configuration method;
   retrieving a plurality of grandchild device name data corresponding to one or more of the grandchild device names, wherein the grandchild device name data includes a grandchild device address and a grandchild device configuration method;
   identifying one of the grandchild device addresses included in the grandchild device name data that matches the unit address that corresponds to the added device; and
   obtaining a grandchild configuration method from the grandchild device name data that corresponds to the identified grandchild device address, wherein the configuring of the added device includes invoking the obtained grandchild configuration method.

8. An information handling system comprising:
one or more processors;
a memory coupled to at least one of the processors;
an operating system stored in the memory and executed by one or more of the processors, wherein the operating system includes one or more partitions; and
a set of instructions stored in the memory and executed by at least one of the processors in order to perform actions of:
  detecting that a device has been added to the operating system partition, wherein the detecting occurs during a dynamic reconfiguration process, and wherein the device is associated with a device type;
  identifying a parent device that corresponds to the added device, wherein the identifying is performed during the dynamic reconfiguration process, wherein the identified parent device is based on the device type of the device, and wherein the identified parent device corresponds with a parent device name;
  retrieving a unit address corresponding to the added device;
  passing the retrieved unit address and the identified parent device name to a configuration manager process; and
  configuring the added device based on the identified parent device name.

9. The information handling system of claim 8 wherein the parent device name is a system bus in response to the device type being a slot device, wherein the parent device name is a virtual bus in response to the device type being a virtual slot device, and wherein, in response to the device type being a PCI hot plug slot, the parent device name is a PCI bus that corresponds to a slot where the device was added.

10. The information handling system of claim 8 wherein the set of instructions performs additional actions comprising:
  making the added device available to processes by including the added device in a system device tree;
  checking a resource type of the added device; and
  retrieving parent device data corresponding to the identified parent device name from an object data manager.

11. The information handling system of claim 10 wherein the set of instructions performs additional actions comprising:
  obtaining a parent configuration information handling system from the retrieved parent device data, wherein the configuring of the added device includes invoking the obtained parent configuration information handling system.

12. The information handling system of claim 11 wherein the set of instructions performs additional actions comprising:
  executing the obtained parent configuration information handling system in response to the invoking;
  receiving one or more child device names in response to the execution of the obtained parent configuration information handling system;
  retrieving a plurality of child device name data corresponding to one or more of the child device names, wherein the child device name data includes a child device address and a child device configuration information handling system;
  identifying one of the child device addresses included in the child device name data that matches the unit address that corresponds to the added device; and
  obtaining a child configuration information handling system from the child device name data that corresponds to the identified child device address, wherein the configuring of the added device includes invoking the obtained child configuration information handling system.

13. The information handling system of claim 12 wherein the executing, receiving, retrieving, identifying, and obtaining steps are recursively repeated for one or more additional levels of child devices.

14. The information handling system of claim 12 wherein the set of instructions performs additional actions comprising:
  executing the obtained child configuration method in response to the invoking;
  receiving one or more grandchild device names in response to the execution of the obtained child configuration method;
  retrieving a plurality of grandchild device name data corresponding to one or more of the grandchild device names, wherein the grandchild device name data includes a grandchild device address and a grandchild device configuration method;
  identifying one of the grandchild device addresses included in the grandchild device name data that matches the unit address that corresponds to the added device; and
  obtaining a grandchild configuration method from the grandchild device name data that corresponds to the identified grandchild device address, wherein the configuring of the added device includes invoking the obtained grandchild configuration method.

15. A computer program product stored in a computer memory, comprising functional descriptive material that, when executed by an information handling system, causes the information handling system to perform actions that include:
  detecting that a device has been added to an operating system partition, wherein the detecting occurs during a dynamic reconfiguration process, and wherein the device is associated with a device type;
  identifying a parent device that corresponds to the added device, wherein the identifying is performed during the dynamic reconfiguration process, wherein the identified parent device is based on the device type of the device, and wherein the identified parent device corresponds with a parent device name;
  retrieving a unit address corresponding to the added device;
  passing the retrieved unit address and the identified parent device name to a configuration manager process; and
  configuring the added device based on the identified parent device name.

16. The computer program product of claim 15 wherein the parent device name is a system bus in response to the device type being a slot device, wherein the parent device name is a virtual bus in response to the device type being a virtual slot device, and wherein, in response to the device type being a PCI hot plug slot, the parent device name is a PCI bus that corresponds to a slot where the device was added.

17. The computer program product of claim 15 wherein the actions further comprise:
  making the added device available to processes by including the added device in a system device tree;
  checking a resource type of the added device; and
  retrieving parent device data corresponding to the identified parent device name from an object data manager.

18. The computer program product of claim 17 wherein the actions further comprise:
  obtaining a parent configuration computer program product from the retrieved parent device data, wherein the configuring of the added device includes invoking the obtained parent configuration computer program product.

19. The computer program product of claim 18 wherein the actions further comprise:
    executing the obtained parent configuration computer program product in response to the invoking;
    receiving one or more child device names in response to the execution of the obtained parent configuration computer program product;
    retrieving a plurality of child device name data corresponding to one or more of the child device names, wherein the child device name data includes a child device address and a child device configuration computer program product;
    identifying one of the child device addresses included in the child device name data that matches the unit address that corresponds to the added device; and
    obtaining a child configuration computer program product from the child device name data that corresponds to the identified child device address, wherein the configuring of the added device includes invoking the obtained child configuration computer program product.

20. The computer program product of claim 19 wherein the actions further comprise:
    executing the obtained child configuration method in response to the invoking;
    receiving one or more grandchild device names in response to the execution of the obtained child configuration method;
    retrieving a plurality of grandchild device name data corresponding to one or more of the grandchild device names, wherein the grandchild device name data includes a grandchild device address and a grandchild device configuration method;
    identifying one of the grandchild device addresses included in the grandchild device name data that matches the unit address that corresponds to the added device; and
    obtaining a grandchild configuration method from the grandchild device name data that corresponds to the identified grandchild device address, wherein the configuring of the added device includes invoking the obtained grandchild configuration method.

* * * * *